July 25, 1950 M. VICHIE ET AL 2,516,277
HARVESTER FOR SUGAR CANE AND SIMILAR CROPS
Filed Dec. 17, 1945 6 Sheets-Sheet 1

INVENTORS
MARTIN VICHIE & CHARLES A. N. YOUNG
By Young, Emery & Thompson
ATTYS-

July 25, 1950 M. VICHIE ET AL 2,516,277
HARVESTER FOR SUGAR CANE AND SIMILAR CROPS
Filed Dec. 17, 1945 6 Sheets-Sheet 3

INVENTORS
MARTIN VICHIE & CHARLES A. N. YOUNG
BY Young, Emery & Thompson
ATTYS July 25, 1950  M. VICHIE ET AL  2,516,277
HARVESTER FOR SUGAR CANE AND SIMILAR CROPS
Filed Dec. 17, 1945  6 Sheets-Sheet 4

INVENTORS
MARTIN VICHIE & CHARLES A. N. YOUNG
BY Young, Emery, & Thompson
ATTYS

Patented July 25, 1950

2,516,277

UNITED STATES PATENT OFFICE 2,516,277

HARVESTER FOR SUGAR CANE AND SIMILAR CROPS

Martin Vichie, Bundaberg, Queensland, and Charles Arthur Noel Young, Tantitha, Bundaberg, Queensland, Australia, assignors to Fairymead Sugar Company Limited, Bundaberg, Queensland, Australia, a company of Queensland Application December 17, 1945, Serial No. 635,596
In Australia October 4, 1945

7 Claims. (Cl. 56—17)

1

This invention relates to apparatus for harvesting sugar cane and like crops and which is mounted upon or includes a transport vehicle having a common power plant adapted for operating the harvester mechanism as the apparatus moves forward through the crop. More particularly, the invention concerns that type of apparatus which embodies a cane butt cutter adapted to sever the standing sugar cane at or adjacent to the ground level, means for deheading the sugar cane immediately before or after the butt portion of each cane has been severed and whilst the cane is still upright and a conveyor for delivering the cut cane into a hopper for subsequent discharge as required.

The primary object of the invention is to provide improved sugar cane harvesting apparatus of the kind indicated which enables a plurality of rows of standing cane to be harvested simultaneously whilst the cut cane from adjacent rows is collected and periodically dumped in common spaced heaps as the apparatus moves forward through the crop, thus reducing subsequent handling of the cut cane to a minimum.

Another object is to provide improved sugar cane harvesting apparatus of the kind indicated which is capable of being readily mounted upon a suitably modified tractor or like self-propelled vehicle so as to provide a pair of harvesting units located, one at each side of the vehicle and which are adapted to be power driven independently from the power plant of the tractor.

A further object is to provide in sugar cane harvesting apparatus of the kind indicated, relatively simple and effective retaining means for preventing the cut cane which continues to enter the hopper during dumping operations, from being scattered on the ground between the spaced heaps, said retaining means being automatically moved into an operative position upon actuation of dumping means to open the hopper.

A still further object is to provide in cane harvesting apparatus of the kind indicated, simple and efficient discharge means for directing the severed leafy tops and like trashy material sidewardly of the apparatus as it moves forward, thus preventing the severed tops from being directed rearwardly and falling where they would be likely to impede subsequent collection of the heaps of cut cane.

Various other objects and structural features of the invention will, however, be more readily apparent from the following description which refers, by way of example, to one suitable embodiment in which provision is made for harvesting two rows of crop simultaneously.

Referring to the drawings which form part of this specification.

In the embodiment illustrated, the improved cane harvester is adapted for mounting upon any suitable type of tractor or like self-propelled vehicle.

Figures 1, 4:
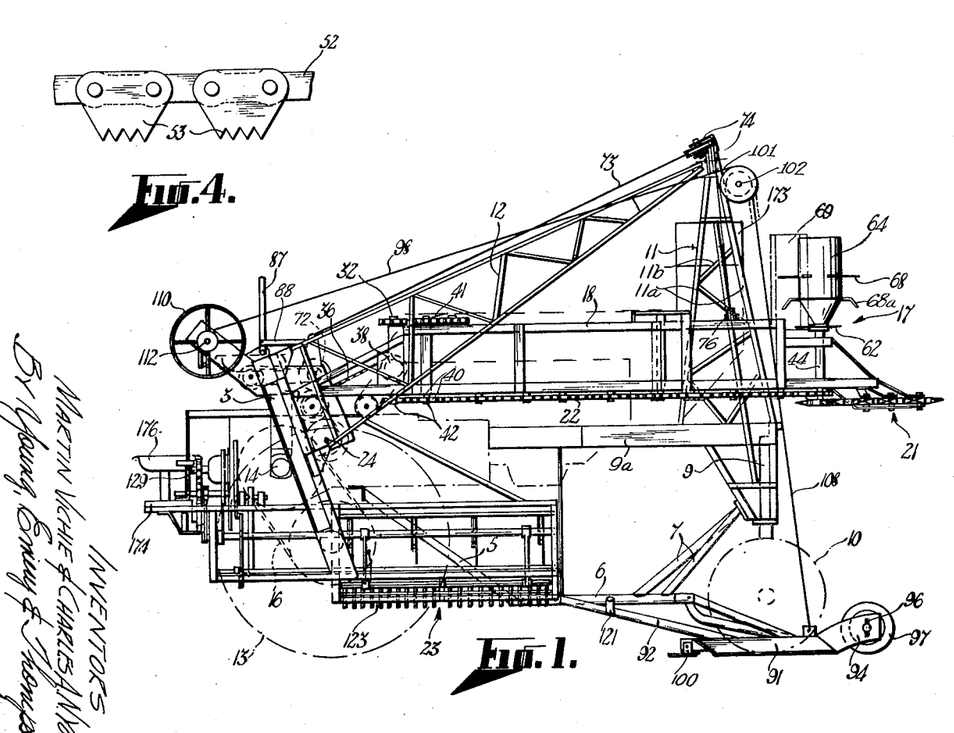
Figure 1 is a semi-diagrammatic side elevation of apparatus for harvesting sugar cane and the like, in accordance with one practical embodiment of the invention.
Figure 4 is an enlarged detail showing portion of an endless conveyor for delivering the cut cane into a hopper.
Figure 2:
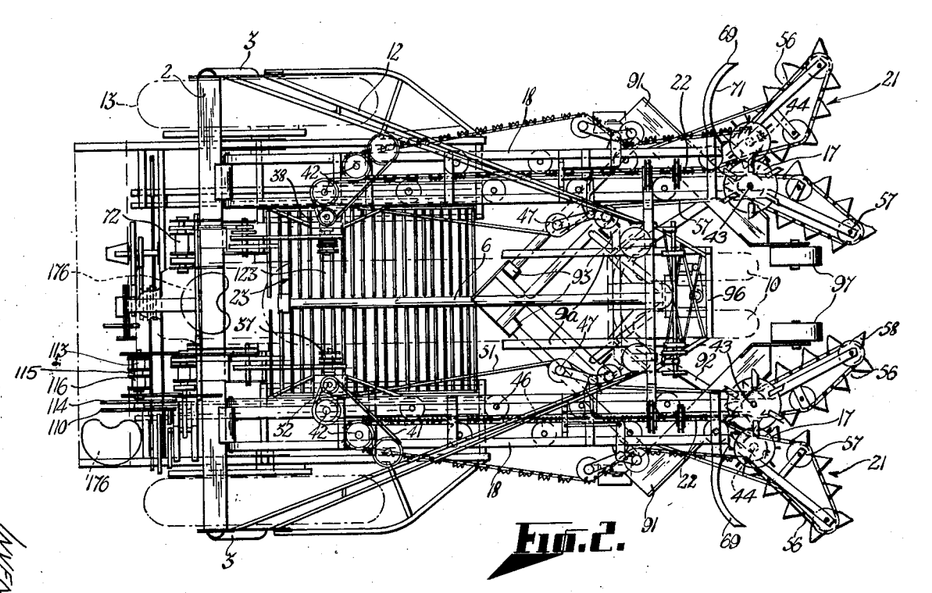
Figure 2 is a plan view of Figure 1, parts being omitted for convenience of illustration.
Figures 3, 6, 7, 8, 9:
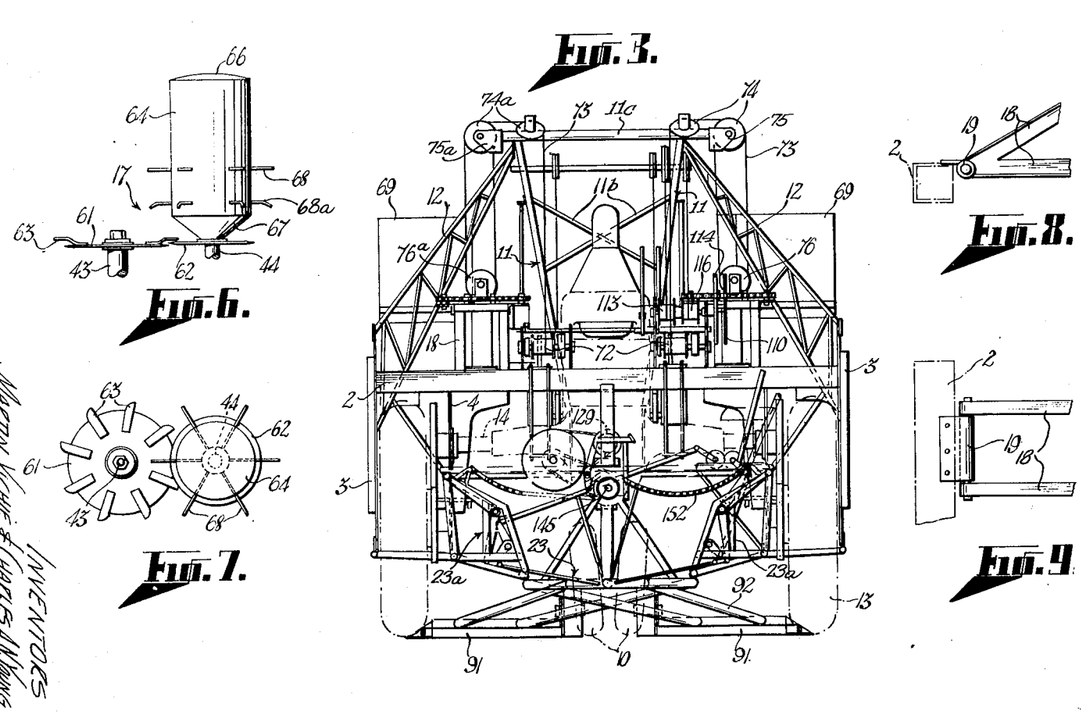
Figure 3 is a rear elevation of Figure 1.
Figures 6 and 7 are an enlarged side elevation and a plan view respectively of one of the cane deheading means.
Figures 8 and 9 are a fragmentary side elevation and a plan view respectively of a hingeable mounting for a secondary supporting frame of each harvesting unit.
Figure 5:
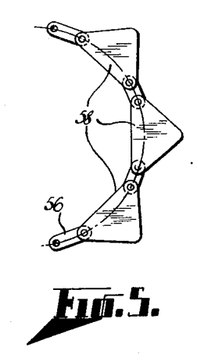
Figure 5 is an enlarged detail showing portion of one of a plurality of endless gathering chains for feeding the standing cane to deheading means.

As seen more clearly in Figures 1, 2 and 3, the main or primary mounting frame of the apparatus may include a cross frame member 2 adapted to be secured to the tractor body near the rear thereof and carrying outer side frame members 3, inner side frame members 4 and a rear strut 5. The latter which may be secured at its rear end to the tractor, extends downwardly and forwardly and is connected to a central frame member 6 having front struts 7 secured to depending frame members 9. These may be carried by a plurality of forwardly extending frame members 9a interconnected by a cross bar 9b and mounted upon the front portion of the tractor, the front ground wheels 10 of which are carried by the frame members 9. The frame members 9a carry an upstanding supporting frame 11 which is located centrally of the apparatus adjacent to the front thereof and may consist of two laterally spaced pairs of posts 11a interconnected by reinforcing members 11b and carrying a cross beam 11c. This upstanding supporting frame may be reinforced by side bracing members 12 diverging sidewardly and rearwardly to the main frame adjacent to the rear of the apparatus.

The outer side frame members 3 carry axles upon which the rear wheels 13 of the tractor are mounted. The normal rear axles 14 of the tractor may be shortened and journalled in bearings on the inner side members 4. Any suitable chain drive 16 may be employed for transmitting the drive to the rear wheels.

The tractor and the primary mounting frame carried thereby form a mobile unit upon which the various component parts of the harvester may be conveniently mounted whilst in addition, the power plant of the tractor is adapted to function as a common source of power for the various power driven parts of the apparatus.

Mounted upon the primary mounting frame is a pair of harvesting units located one at each side of the tractor. Each harvesting unit includes cane deheading means 17 which may be conveniently mounted upon one of a pair of secondary mounting frames 18. The latter may each consist of a plurality of longitudinal and transverse frame members 18a and 18b and upright frame members 18c adapted to form a structure which is of substantially square shape in cross section and of elongated rectangular formation in plan. Each of the secondary mounting frames extends forwardly of the tractor and elevating means is provided for independently raising and lowering the secondary mounting frames so that the cane deheading means may deal with crops of different heights. For this purpose, each secondary mounting frame may be hingeably connected as at 19 at or adjacent to its rear end to the main cross bar 2 of the primary mounting frame and be supported at or adjacent to its front end by any suitable system of ropes and pulleys as hereinafter described.

Associated with the deheading means on each of the secondary mounting frames 18 is cane gathering means 21 and a conveyor 22 for delivering the cut cane into a common hopper 23 as hereinafter described. All of these devices may be power driven from the tractor and for this purpose, one or more power take-off shafts 24 may be provided.

Figure 11:
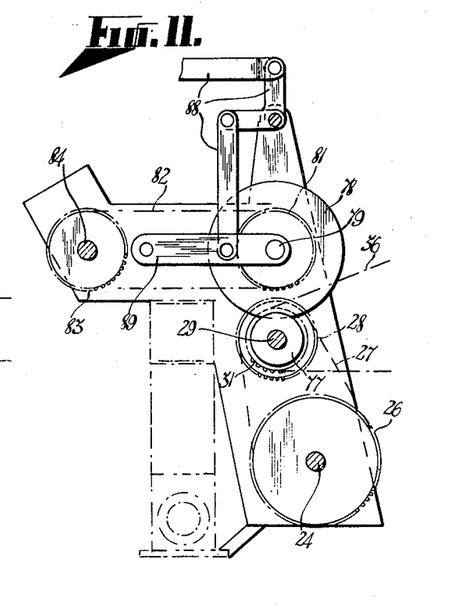
Figure 12:
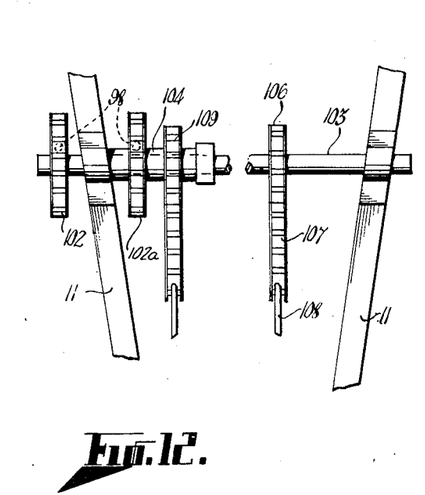
Figures 12 and 13 are enlarged front and side elevations respectively of a part of the elevating means for raising and lowering shear blades employed for severing the standing cane at or adjacent to the ground level.

A chain drive is preferably employed for actuating each cane deheading means 17 and its associated gathering means and conveyor. For this purpose, each power take-off shaft 24 may be fitted as shown in Figs. 1, 2 and 11, with a sprocket wheel 26 for transmitting the drive through a chain 27 to a sprocket wheel 28 on a lay-shaft 29. Fitted to said lay-shaft is an additional sprocket 31 from which the drive may be transmitted to upright driving shafts 32 for the cane conveyors, through chains 36 and friction clutches 37 (Fig. 2) and to any suitable reduction gearing housed in gear boxes 38. The drive shafts 32 transmit the drive through chains 41 to sprockets mounted on upright conveyor shafts 42 which are journalled in bearings on the secondary mounting frames. The shafts 42 carry sprockets 40 at their lower ends for the cane conveyors 22.

The aforesaid cane conveyors may comprise endless chains extending around sprockets on the shafts 42 and adapted to transmit rotary motion to laterally spaced upright shafts 43 and 44 at or adjacent to the forward ends of the secondary mounting frames 18 and adapted to carry the cane deheading means as hereinafter described.

The conveyor chains are supported at spaced points along the secondary mounting frames by longitudinally spaced idler sprockets 46, and are maintained at the required tension by any suitable tension regulating devices such, for example, as pairs of spring influenced idler sprockets 47.

The driving ratios of the several sets of gearing hereinbefore described, both chain and toothed, are such that the cane conveyor of each harvesting unit are adapted to move rearwardly when in use, at substantially the same speed as the forward speed of the harvester. By this arrangement, sideward bending of the sugar cane during harvesting is either eliminated or reduced to a minimum, thus ensuring the cane being harvested without being split or broken during the cutting and deheading operations.

Each cane conveyor 22 preferably consists of two endless chains operatively positioned upon their secondary mounting frame 18, in such a manner that the adjacent sides of said chains are located in closely spaced parallel relationship so that the cut cane may be gripped therebetween. For this purpose, one of the conveyor chains 51 may be of conventional roller chain construction whilst the associated chain 52 is provided with longitudinally spaced serrated plates 53 projecting sidewardly of the chain as seen more clearly in Figure 4 of the drawings. These serrated plates are adapted to grip the cane stalks against the adjacent conveyor chain and to carry it rearwardly to a point above the hopper 23 where the cane is automatically released by the associated chains moving apart as they pass around their sprockets on the shafts 42.

Mounted in advance of each cane deheading means the gathering mechanism 21 for directing the tops of the standing cane towards the deheading means. Such gathering mechanism may include sprockets secured to the lower end of the shafts 43, 44 and carrying endless chains 56 passing around idlers 57 mounted on extensions of the secondary mounting frames. The endless chains 56 are preferably fitted with longitudinally spaced triangular or like side plates 58 which may have a pitch equivalent to three normal chain pitches. These plates which may be varied in shape and pitch to suit the nature of the crop to be harvested, function to gather the stalks there between and pass them back to the deheading means and the associated conveyors.

Each of the cane deheading means preferably includes a pair of overlapping cutting discs 61, 62 carried by the shafts 43, 44. As seen more clearly in Figures 6 and 7 of the drawings, each inner disc 61 may be of larger diameter than its outer disc 62 and be provided with circumferentially spaced radial fingers 63. The latter project beyond the edge of their associated disc and may be off-set so that the edge portion of the associated cutting disc 62 may rotate freely between the fingers and their disc 61. These fingers are spaced in such a manner that they function to separate the cane being fed to the deheading means and prevent the possibility of jamming occurring during the deheading operation.

The deheading means also includes means for clearing the severed leafy tops and other trashy material from the cutting discs and discharging such material well clear of the apparatus at opposite sides thereof so as to prevent the possibility of such trashy material becoming mixed with the cut cane and thus interfering with the subsequent collection thereof. For this purpose, each of the shafts 44 may be fitted with a drum 64 which may be composed of sheet metal, closed at the top as at 66 and provided with a conical lower end portion 67. Each drum may be provided with a plurality of vertically spaced sets of clearing arms 68 and 68a which are spaced circumferentially of the drum and adapted to collect the severed cane tops and fling them sidewardly.

Associated with the clearing arms is a deflector plate 69 which may be carried by the associated secondary mounting frame 18 and extend sidewardly in relation to the drum. Each deflector plate may be of arcuate form with the concave face 71 of the deflector plate facing forwardly and partially encircling its drum and the clearing arms carried thereby.

In order to deal with crops of varying heights, means are provided for independently raising and lowering each of the cane deheading means 17 together with the cane gathering and conveying mechanisms associated therewith. The elevating mechanism enables adjustment of the deheading means to be effected without interrupting the drive during the forward movement of the apparatus through the crop. Such elevating means may comprise power driven drums 72 on the primary mounting frame, each of which is independently operable. Cables 73 pass forwardly and upwardly from the drums through sheaves 74, 74a on the aforesaid upstanding support 11, thence downwardly through sheaves 75, 76a on the forward ends of the secondary supporting frames 18 and finally upwardly for connection to the side plates 75, 75a of sheaves 74, 74a.

Figure 10:
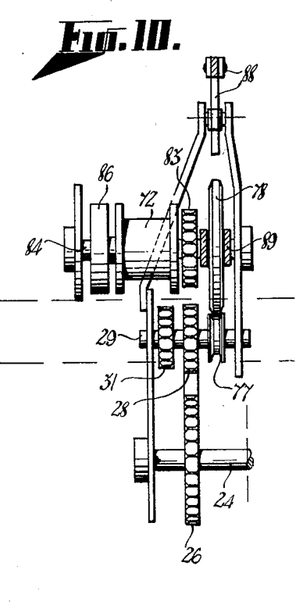
Figures 10 and 11 are enlarged front and side elevations respectively showing part of the driving mechanism for the cane deheading means, and also the elevating means for each cane harvesting unit.

The power drive for the drums 72 of the elevating means may include grooved friction wheels 77 (Figs. 10, 11) mounted on shafts 29 and mating with friction wheels 78 secured to shafts 79. The latter may be fitted with sprockets 81 carrying endless chains 82 which pass around sprockets 83 carried by shafts 84 on which the drums 72 are mounted. Rotary motion may be transmitted from the drum shafts to the drums through any suitable type of mechanical load brakes 86 which may be manually controlled by means of hand levers 87 connected by any suitable system of pivoted links and levers 88 with the friction wheels 78. As seen in Fig. 11 each friction wheel 78 may be carried by a pivoted arm 89 so that it may swing into and out of engagement with the associated friction wheel 77 as required. Disengagement of the friction wheels 77, 78 after the deheading means 17 have been raised to the required height engages the mechanical load brakes 86 whilst further disengagement of the friction wheels releases the brakes and allows the deheading means to be lowered as required.

In combination with the foregoing, each of the harvesting units includes a cutter for severing the standing cane at or about ground level. For this purpose, a pair of laterally spaced and inclined shear blades 91 may be arranged at the forward end of the apparatus. Each of the shear blades is preferably mounted upon a separate set of supporting arms 92 which may be hingeably connected as at 93 to the front centre member 6. The hinged supporting arms are preferably provided with forward extensions 94 having upright slots 96 in which the axles of ground wheels 97 may be positioned and locked. These ground wheels are preferably fitted with pneumatic tyres and are adapted to regulate the position of the shear blades in relation to the ground level.

Figure 13:
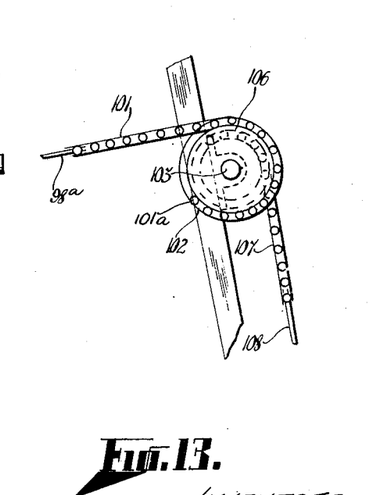

For the purpose of raising the shear blades well clear of the ground when the apparatus is not in use and is travelling to different localities, suitable elevating means are provided. Such elevating means may comprise cables 98 which are fastened to drums as hereinafter described and may be provided at their outer ends 98a (Fig. 13) with chains 101 for connection to sprockets 102.

Two of these sprockets 102, 102a are provided, both being carried by a cross shaft 103 journalled in bearings on the upright supporting frame 11. One of the sprockets 102 is fixed to the shaft whilst the other sprocket 102a is fixed to a sleeve 104 freely rotatable on the shaft. The chains 101 extend partially around the sprockets and are anchored at their outer ends 101a in any suitable manner thereto. Also to the shaft 103 is a sprocket 106 having a similar chain 107 anchored thereto and secured at its opposite end to a cable 108 which extends downwardly for connection to the hinged supporting arms 92 of one of the shear blades. The other shear blade is connected in a similar manner with another sprocket 109 on the sleeve 104.

The shear blades 91 may be raised and lowered manually. For this purpose, a hand wheel 110 may be fixed on a cross shaft 112 journalled in bearings on the primary mounting frame and carrying a drum 113. A similar hand wheel 114 (Fig. 2) and drum 116 are securely fastened to a sleeve 115 which is free to rotate on the shaft 112 independently of the hand wheel 110 and its drum. The two drums are preferably fitted with any suitable mechanical load brakes similar to those associated with the drums 72 and which are adapted to hold the shear blades when raised and to provide a balanced and easily controlled lowering movement.

Bolts and slots 100 or any other suitable means may be provided for connecting the shear blades 91 to the pivoted supporting arms 92 for the purpose of adjusting their operative position as in some crops it is preferable to shear the standing stalks at the butts before the tops are severed, whilst in other crops better results are obtained by shearing the butts after removal of the tops. In both cases, the arrangement is such that the deheading means 17 over-hang the shear blades which are capable of being adjusted forwardly or rearwardly in relation to the deheading means so that the cane tops may be removed either immediately before or after the cane butts have been severed and whilst the cane is still occupying an upright attitude.

As seen more clearly in Figures 1 and 2, the conveyor chains are adapted to grip the ends of the cane stalks and carry them rearwardly until they are finally deposited in the common hopper 23. Whilst being conveyed rearwardly, the lower ends of the cane stalks strike a cross bar 121 on each of the respective sets of supporting arms 92, the cross bars being adapted to cause the stalks to tilt until the stalks are finally released by the conveyors 22, whereupon the stalks fall in a substantially horizontal attitude into the hopper with the butts of the cane facing the front of the apparatus.

The common hopper 23 is located on the primary mounting frame centrally between the spaced harvesting units adjacent to the rear thereof and near the ground level, and is provided with opposite side entrances 23a adapted to receive the cut cane from the harvesting units. In addition the hopper is provided with dumping means for periodically dumping the cut cane upon the ground after a sufficient quantity of cane has accumulated in the hopper.

Figure 14:
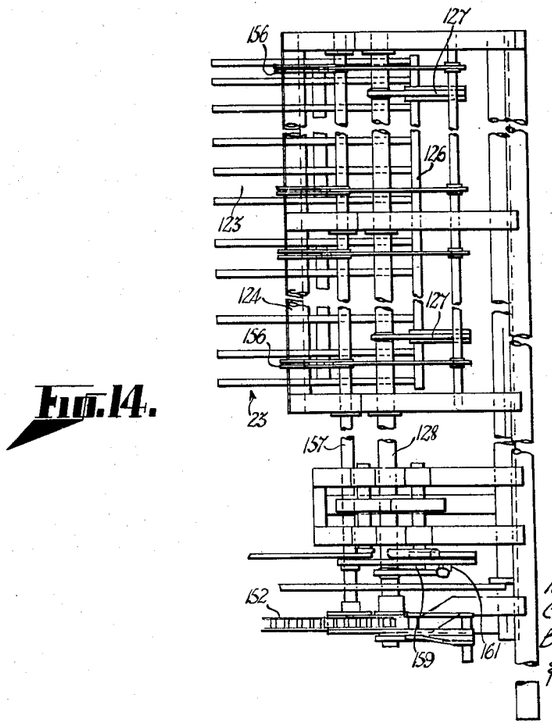
Figures 14 and 15 are enlarged plan and end views respectively of portion of the cane dumping means employed in the hopper.
Figure 15:
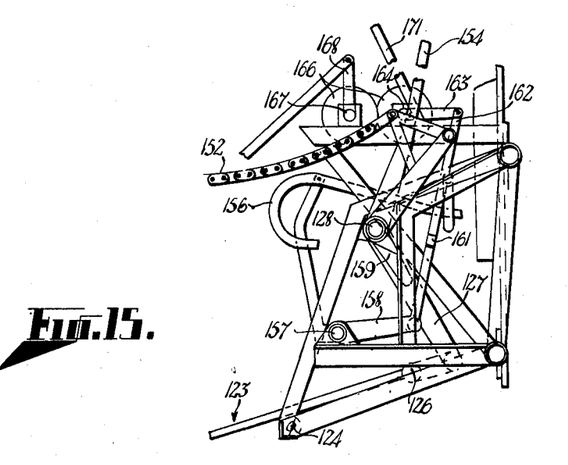

The dumping means includes two opposed floor sections adapted to close the bottom of the hopper. These floor sections may consist of oppositely inclined grids 123 (Figs. 3, 14 and 15) which are adapted to be moved transversely of the apparatus towards and away from each other so that the cane may be dumped through the gap so formed. If desired, each grid may be provided with a sheet metal cover to prevent short stalks from falling therethrough. The grids may be supported upon intermediate rollers 124 and be connected to side bars 126 which are linked to crank arms 127 on shafts 128 located at opposite sides of the hopper and operatively interconnected.

Figure 16:
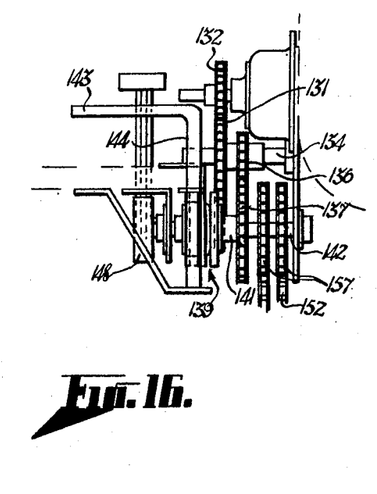
Figures 16 and 17 are an enlarged side view and a rear elevation respectively of power driving mechanism for the dumping means.
Figure 17:
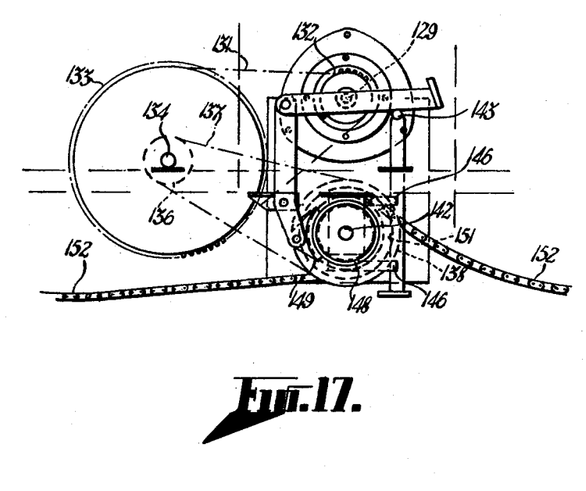

The shafts 128 are adapted to be power driven from a power take-off shaft 129 at the rear of the tractor (as seen in Figs. 16 and 17). The power drive may include an endless chain 131 passing around a sprocket 132 fixed to the shaft 129. A sprocket 136 is also fixed to shaft 134 and through another endless chain 137 is adapted to impart motion to a sprocket 138 which together with one section of a dog clutch 139 is fixed to a sleeve 141 which is free to rotate on shaft 142. A pedal lever 143 may be connected to an upright shaft 144 rotatable in bearings on the main tractor body and carrying outstanding arms 146 which are provided with projections for engaging an annular groove in the body of a complementary section of the dog clutch 139. This clutch section is slidably mounted on the shaft 142 but keyed or splined thereto. Fixed also to the outer end of the shaft 142 is a brake drum 148 having a pedal operated brake shoe 149 for arresting rotation of the shaft when so desired.

Pressure applied to the lever 143 causes partial rotation of its shaft and swinging movements of the arms 146 so as to cause the associated clutch sections to engage. Thus rotation is imparted to the shaft 142 which carries chain sprockets 151 connected to chains 152 which are coupled at their opposite ends to the aforesaid crank arms 127. By this arrangement rotation of the shaft 142 is adapted to swing the cranks 127 and cause the grid sections to be drawn sidewardly or away from each other for the purpose of dumping the cut cane thereon when so desired.

The complementary projections and recesses of the dog clutch 139 are preferably bevelled so that in the event of the operator not releasing the pedal lever 143 when the grid sections have been drawn back to the full extent, the added tension on the chains 152 causes the clutch to slip and thus provide a warning which is both heard and felt by the operator. Immediately upon releasing the lever 143 pressure may be applied to the brake pedal to arrest rotation of the shaft and thus retain the dumping grids in their open position. Release of the brake pedal allows the grids to return to their closed position under the influence of their own weight but the return movements may be assisted by applying manual pressure to a hand lever 154 which may be fixed to the shaft 128.

It will be apparent that any stalks that are delivered to the hopper whilst the grids are open for dumping, may be scattered indiscriminately along the path of the machine thus interfering with the subsequent collection of the heaps of sugar cane. In order to avoid this objection provision is made for temporarily retaining the cane which continues to be fed to the hopper during the dumping operations. Such retaining means may comprise two series of retaining arms 156 mounted on rocker shafts 157 at opposite sides of the hopper and operatively connected together. Crank arms 158 may be fitted to these shafts for imparting partial rotation thereto.

Means are provided for automatically moving the retaining arms 156 into an operative position upon opening of the dumping mechanism and for this purpose one of the shafts 128 may be provided with a striker arm 159 adapted to engage a shoulder or projection 161 on a link or the like 162 connected to one of the cranks 158. The upstanding end of the link may be secured to a crank 163 which is fixed to a shaft 164 which may be geared as at 166 to a shaft 167 carrying a crank 168 which is linked to one of the cranks on the rocker shaft 157 of the other set of retaining arms. It will be apparent that the interconnection enables the retaining arms 156 to be swung forwardly when required, so as to form racks which the cut cane rests upon until the retaining arms are withdrawn and the cane is freed to fall into the hopper.

A manually operable lever 171 may also be fitted to the crank 163 so as to actuate the retaining members when so desired, such for example as for dislodging any stalks that may tend to stick up in the hopper. For convenience of illustration, the retaining members 156 have been shown in Figure 15 in their operative position, ready to receive the cane stalks whilst the hopper grid 123 is shown in a partially retracted position only.

An air duct 173 (Fig. 1) may be mounted upon the main body of the apparatus and connected to the normal intake of the tractor engine. This duct is fitted with one or more internal screens for the purpose of filtering the air stream passing through the tractor radiator.

A wooden or metal platform 174 and seats 175 may be provided on the primary mounting frame at the rear of the apparatus for the operators.

In use, as the apparatus moves forwardly through the crop, sugar cane is harvested simultaneously from two adjacent rows. The cane tops are gathered by the gathering means 21 and conveyed to the deheading discs 61, 62 after which the severed tops are flung clear of the apparatus at opposite sides thereof. The standing sugar cane is severed at the butt either immediately before or after the tops have been removed, the cane stalks being conveyed rearwardly and automatically tilted until they are finally released by the conveyors 22 and permitted to fall in a substantially horizontal attitude into the side entrances of the common hopper 23.

The cut cane from the pair of harvesting units enters the hopper from the opposite sides thereof and gravitates onto the dumping floor sections 123 after which it is periodically dumped on the ground in suitable sized heaps for subsequent collection. It will be appreciated that the respective harvesting units may be independently raised and lowered as the machine moves forward, in accordance with the height of the crop being harvested and without interrupting the drive. As the machine is completely power driven, any such adjustments may be quickly and easily effected in accordance with requirements.

Although the invention has been described by way of example as embodying a pair of harvesting units mounted upon a conventional type of tractor, it will be readily understood that the invention is not limited thereto but that the improved apparatus may, if desired, be of extended width so as to incorporate a plurality of pairs of harvesting units together with the common hoppers and other mechanism associated therewith.

Various alterations, refinements and or additions may be introduced into the foregoing construction and arrangements of parts without departing from the spirit and scope of the invention, as defined by the appended claims.

Having now described our invention, what we claim as new and desire to secure by Letters Patent is:

1. In apparatus for harvesting sugar cane and like crops in which a power operable transport vehicle has a primary mounting frame thereon and at least one pair of power operable harvesting units each including a cane butt cutter, mechanism comprising cane deheading means overhanging and vertically spaced from said butt cutter, a cane conveyor and means for tilting the cut cane, said harvesting units being positioned in laterally spaced and forwardly extending relationship on said primary mounting frame with a common hopper, having opposite side entrances, located between the harvesting units of each pair, power operable elevating mechanism having means for independently raising and lowering each of said cane deheading means and dumping means in said hopper whereby the cane butt cutters and the associated deheading means simultaneously cut through the cane in adjacent rows of the crop while the apparatus is moving forward and the cane occupies an upright position, the cut cane being gripped near its upper ends by the conveyors and carried rearwardly until it engages the tilting means and is subsequently automatically released above the side entrances of each common hopper into which it falls in a substantially horizontal attitude and gravitates through the opposite sides thereof onto said dumping means.

2. Apparatus according to claim 1, wherein each said harvesting unit includes an elongated secondary mounting frame for said deheading means, each secondary frame being pivotally mounted at or adjacent to its rear end upon said primary frame so that the forward end may be raised or lowered in relation to said cane butt cutter, said elevating means comprising an upstanding common support for each pair of harvester units, said common support being carried by said primary mounting frame and located between the secondary mounting frames of each pair of harvesting units, and a plurality of power operable drums or winches, one for each harvesting unit, each drum being operatively connected to one of said secondary mounting frames by a system of ropes and pulleys on said common support and being provided with independent control mechanism whereby the deheading means of each harvesting unit may be independently adjusted vertically as the apparatus is moving forward and without interrupting the drive of the harvesting unit.

3. Apparatus according to claim 1 wherein said dumping means comprises two opposed floor sections adapted to form the hopper bottom and carried by side bars or supports at opposite sides of the hopper each said floor section being mounted upon an intermediate supporting roller or bar whilst their side bars are linked to crank arms which are mounted upon shafts at opposite sides of the hopper and are operatively interconnected, and means for swinging said crank arms in opposite directions whereby said floor sections may be moved sidewardly or away from each other so as to permit the sugar cane thereon to be dumped upon the ground through the gap so formed between said floor sections.

4. Apparatus according to claim 1 wherein said dumping means comprises two opposed floor sections adapted to form the hopper bottom and carried by side bars or supports at opposite sides of the hopper each said floor section being mounted upon an intermediate supporting roller or bar whilst their side bars are linked to crank arms which are mounted upon shafts at opposite sides of the hopper and are operatively interconnected with a common power operable drive shaft having a clutch and brake device, and means for swinging said crank arms in opposite directions whereby said floor sections may be moved sidewardly or away from each other so as to permit the sugar cane thereon to be dumped upon the ground through the gap so formed between said floor sections.

5. Apparatus according to claim 1 in which driving mechanism is provided for independently operating each of said harvesting units and the dumping mechanism in said hopper from a common power plant which is located on and adapted to propel said transport vehicle, the driving mechanism for the conveyor of each harvesting unit including means for automatically driving said cane conveyors rearwardly at substantially the same speed as the forward speed of the vehicle when the apparatus is in use whereby the standing sugar cane is harvested without being split or broken during the cutting and deheading operations.

6. Apparatus according to claim 1 wherein said hopper is provided with automatic retaining means for preventing the cut cane which enters the hopper during the dumping operation from being scattered on the ground, said retaining means comprising two opposed sets of retaining arms arranged in laterally spaced relationship upon rocking shafts located one at each side of the hopper, and automatic actuating means for rocking said shafts during said dumping operation so as to automatically position said series of retaining arms in the desired operative position.

7. Apparatus according to claim 1 wherein said hopper is provided with automatic retaining means for preventing the cut cane which enters the hopper during the dumping operation from being scattered on the ground, said retaining means comprising two opposed sets of retaining arms arranged in laterally spaced relationship upon rocking shafts located one at each side of the hopper, and automatic actuating means for rocking said shafts during said dumping operation so as to automatically position said series of retaining arms in the desired operative position the actuating mechanism of said dumping means including a plurality of crank arms mounted upon shafts at opposite sides of the hopper and which are operatively interconnected, whilst said automatic actuating means includes a striker on one of said crank arm shafts and a shoulder on linkage interconnecting said rocker shafts, said linkage being also connected to a hand lever so that the retaining arms may be manually actuated when so desired.

MARTIN VICHIE.
CHARLES ARTHUR NOEL YOUNG.

REFERENCES CITED

The following references are of record in the file of this patent:

UNITED STATES PATENTS

| Number | Name | Date |
|---|---|---|
| 318,942 | Baumgartner | June 2, 1885 |
| 387,061 | Fatic | July 31, 1888 |
| 496,003 | Roach | Apr. 25, 1893 |
| 1,051,839 | Hazard | Jan. 28, 1913 |
| 1,365,213 | Woodland | Jan. 11, 1921 |
| 1,468,195 | Curbelo | Sept. 18, 1923 |
| 2,281,904 | Wurtele | May 5, 1942 |
| 2,346,963 | Hague | Apr. 18, 1944 |
| 2,380,161 | Flook | July 10, 1945 |